United States Patent
Zuerker et al.

(10) Patent No.: US 10,550,742 B2
(45) Date of Patent: Feb. 4, 2020

(54) SEPARATING MODULE, LINE MODULE, AND VENTILATION DEVICE

(71) Applicant: MANN+HUMMEL GMBH, Ludwigsburg (DE)

(72) Inventors: Markus Zuerker, Dudenhofen (DE); Michael Wolf, Neunkirchen (DE); Matthias Ludwig, Kaiserslautern (DE); Markus Melde, Speyer (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 661 days.

(21) Appl. No.: 15/211,027

(22) Filed: Jul. 15, 2016

(65) Prior Publication Data

US 2017/0014745 A1 Jan. 19, 2017

(30) Foreign Application Priority Data

Jul. 16, 2015 (DE) .................. 10 2015 009 065

(51) Int. Cl.
| | |
|---|---|
| *F01M 11/08* | (2006.01) |
| *F01M 13/04* | (2006.01) |
| *B01D 46/24* | (2006.01) |
| *B01D 46/44* | (2006.01) |
| *B01D 46/00* | (2006.01) |

(52) U.S. Cl.
CPC ......... *F01M 13/04* (2013.01); *B01D 46/0031* (2013.01); *B01D 46/2411* (2013.01); *B01D 46/446* (2013.01); *F01M 2013/0433* (2013.01)

(58) Field of Classification Search
CPC ............... B01D 45/08; B01D 46/0031; B01D 46/0086; B01D 46/003; B01D 46/002; B01D 46/2411; B01D 46/446; F01M 2013/0433; F01M 2013/0461; F01M 2013/0072; F01M 2013/045; F01M 11/08; A47L 9/1641; A47L 9/1625; A47L 9/1683
USPC .... 55/319, 462, 312, 337, 320, 417; 96/381; 95/286, 287, 271, 268; 123/198 E
See application file for complete search history.

(56) References Cited

U.S. PATENT DOCUMENTS

| | | | |
|---|---|---|---|
| 4,632,682 A | 12/1986 | Erdmannsdorfer | |
| 5,660,607 A | 8/1997 | Jokschas et al. | |
| 6,309,436 B1 * | 10/2001 | Holch ................ | B01D 46/0024 123/198 E |
| 2003/0102257 A1 * | 6/2003 | Reid .................... | B01D 35/303 210/232 |

(Continued)

FOREIGN PATENT DOCUMENTS

| | | | |
|---|---|---|---|
| DE | 2510225A1 A1 | 10/1975 | |
| EP | 3069775 A1 * | 9/2016 | ............. B01D 46/00 |

*Primary Examiner* — Minh Chau T Pham
(74) *Attorney, Agent, or Firm* — James Hasselbeck (57) ABSTRACT

A separating module for a ventilation device has a housing that surrounds a separating element designed to separate liquid particles from a gas flow. A line module and a ventilation device with such a separating module and such a line module are provided. The housing of the separating module is designed to be connected to the line module that has at least three geometrically parallel channels and the housing of the separating module has corresponding housing openings to be connected to the at least three channels. Several separating modules and several line modules can be combined to adapt the ventilation system as needed.

13 Claims, 6 Drawing Sheets

(56) References Cited

U.S. PATENT DOCUMENTS

| | | | | |
|---|---|---|---|---|
| 2004/0031252 | A1* | 2/2004 | Heikamp | B01D 39/2017 55/486 |
| 2005/0217221 | A1* | 10/2005 | Stickland | F04C 29/026 55/319 |
| 2007/0240391 | A1* | 10/2007 | Becker | B01D 46/0031 55/423 |
| 2007/0256395 | A1* | 11/2007 | Kosmider | B01D 46/0013 55/302 |
| 2011/0023425 | A1* | 2/2011 | De Paepe | B01D 46/0087 55/312 |
| 2014/0000736 | A1* | 1/2014 | Ellis | F04B 39/12 137/565.33 |
| 2014/0033668 | A1* | 2/2014 | Kleynen | B01D 29/21 55/502 |
| 2015/0135961 | A1* | 5/2015 | Sugio | F01N 3/037 96/381 |
| 2016/0272339 | A1* | 9/2016 | D'Orlando | B01D 46/0001 |
| 2016/0273471 | A1* | 9/2016 | Shimpi | B01D 35/143 |
| 2016/0363015 | A1* | 12/2016 | Brand | F01M 13/04 |
| 2018/0021715 | A1* | 1/2018 | Melde | B01D 46/0087 55/312 |

* cited by examiner

SEPARATING MODULE, LINE MODULE, AND VENTILATION DEVICE

BACKGROUND OF THE INVENTION

The present invention relates to a separating module for a ventilation device of an internal combustion engine, wherein the ventilation device is embodied for discharging a gas flow, laden with liquid particles, from a component of an internal combustion engine, in particular a compressor, for instance a compressed air compressor, for example a screw compressor, of an internal combustion engine. The internal combustion engine may be, for instance, a reciprocating piston internal combustion engine, for instance a large engine having an output of at least 1,000 kW. In particular, the present invention relates to a separating module for a crankcase ventilation system (CV) of the internal combustion engine. The separating module comprises a housing that surrounds a separating element embodied for separating the liquid particles from the gas flow.

The present invention furthermore relates to a line module configured to be used with such a separating module and to a ventilation device for discharging from an internal combustion engine a gas flow laden with liquid particles; for separating the liquid particles from the gas flow; and for returning the separated liquid particles to the internal combustion engine, especially to the crankcase ventilation system.

In reciprocating piston internal combustion engines, oil-containing leakage gas, so-called blow-by, is present in the crankcase. Its return into the combustion process is legally mandated worldwide and takes place in so-called closed crankcase ventilation systems. In addition to separating oil, a crankcase ventilation system includes other significant components, such as e.g. a pressure control valve, depending on the ventilation concept. The most important tasks of a crankcase ventilation system are thus separating oil and returning oil to the crankcase, as well as possibly regulating crankcase pressure.

EP 1 718 392 B1 discloses an air dryer unit with two air-oil separators, wherein these two air-oil separators may be removably fixed in the air dryer unit by means of a flange portion. The flange portion comprises a common unfiltered air supply line and a common clean air discharge line for the two air-oil separators. The separated oil is adsorbed in a filter medium, made of aramid fiber material, of the air-oil separator. Thus with this air dryer unit it is not possible to return the oil separated in the air-oil separator to an engine attached to the air dryer unit.

A combination having a plurality of air dryer units is disclosed in EP 1 967 251 B1. Two of these air dryer units are associated with a flange segment and have a common unfiltered air supply line and a common clean air discharge line. For supplying unfiltered air and discharging clean air, the individual flange segments are themselves attached to a common unfiltered air supply line and to a common clean air discharge line.

A separating module of the aforementioned kind is disclosed in DE 44 29 822 A1. This separating module is embodied as an annular coalescer and associated with a modular device for separating oil from aerosol. To be able to adapt this device to desired operating conditions, DE 44 29 822 A1 suggests creating as an adapter element a flange part embodied for attaching the housing of the separating module. Connection lines for supplying and discharging the air and for other flange parts may be arranged on this adapter element. When there are a plurality of flange parts arranged one after another, their channels for supplying and discharging the air are connected to one another. The flange parts do not have a common channel for returning the oil separated in the separating module to an engine attached to the device for separating oil aerosol from air. Instead, for returning oil, a discrete oil return line is attached to each individual separating module (FIGS. 1, 2, and column 3, lines 39 through 45, of DE 44 29 822 A1).

In the oil separator disclosed in FIG. 1 of DE 44 29 822 A1, the air to be de-oiled flows via an inlet 19 (reference number relates to DE 44 29 822 A1) and distributor channels 20 into an outer chamber 21 arranged between the filter medium and the housing 14 of the oil separators 11, 12. In the device disclosed in DE 44 29 822 A1, the unfiltered air travels to the oil separators 11, 12 via this outer chamber 21 and a channel arranged in an adapter element 10. With a plurality of oil separators connected one directly after another, the unfiltered air therefore must pass through all of the outer chambers 21 of the preceding oil separators until it enters the last arranged oil separator.

DE 44 29 822 A1 discloses an embodiment, depicted in FIGS. 2 and 3 of DE 44 29 822 A1, to make it possible, simply by coupling additional flange parts, to have parallel connection of any desired number of oil separating elements and thus to be able to adapt the device for separating oil from an oil-air mixture to any conceivable operating condition. In this embodiment, each line module comprises two inlet openings 23, 30 (reference numbers relate to DE 44 29 822 A1) for supplying air or an oil-air mixture and two outlet openings 31, 32 for discharging air or an oil-air mixture (FIG. 3 and paragraph 3, lines 2 through 11, of DE 44 29 822 A1). In addition, each line module has a third opening that forms an area of the housing of the separating module and surrounds the filter element of the separating module (FIG. 2 of DE 44 29 822 A1).

The object of the invention is to further develop a separating module of the aforementioned kind, a line module of the aforementioned kind, and a crankcase ventilation system of the aforementioned kind such that the latter is constructed in a compact manner, is variably adaptable to different operating conditions, and reliably provides a high degree of separation. Preferably any number of separating modules may be combined with one another. In particular, the number of separating modules of the crankcase ventilation system should be variable as desired and the crankcase ventilation system should be able to be attached simply and rapidly to a component of a machine, for instance of a reciprocating piston internal combustion engine.

SUMMARY OF THE INVENTION

This object is solved for a separating module of the aforementioned kind in accordance with the invention in that the separating module comprises a housing that surrounds a separating element embodied for separating the liquid particles from the gas flow, wherein the housing is configured to be connected to a line module and in that the housing comprises corresponding housing openings for at least three geometrically parallel channels of the line module.

This object is solved for a line module of the aforementioned kind in accordance with the invention in that it comprises at least three geometrically parallel channels that are configured to be connected to corresponding housing openings of the housing of a separating module of the present invention as disclosed above.

This object is solved for a ventilation device of the aforementioned kind in accordance with the invention in that it comprises at least one or at least two separating modules according to the invention and at least two line modules according to the invention, wherein each separating module has one line module associated therewith.

Advantageous embodiments and developments of the present invention are disclosed in the dependent claims.

The present invention is based on the housing of the separating module being embodied to be connected to a line module and the housing of the separating module comprising corresponding housing openings that correspond to at least three geometrically parallel channels of the line module.

All separating module channels of the separating module that conduct fluid, especially gas, aerosol, and liquid, are associated with one of the corresponding housing openings of the housing. This has the advantage that each separating module channel of the separating module that conducts fluid may be connected to one of the three geometrically parallel channels of the line module.

The separating module is preferably designed to be attached
by means of the line module connected to the housing or
by means of the line module connected to the housing and at least one further line module that is connected to the line module connected to the housing
to a component, especially to a compressor, for instance to a compressed air compressor, for instance a screw compressor, of an engine connected to the ventilation device, in particular of an internal combustion engine, for instance of a reciprocating piston internal combustion engine, for example of a large engine having an output of at least 1,000 kW.

One of the housing openings of the housing of the separating module is preferably embodied for supplying unfiltered gas, especially unfiltered air, to the separating module. To this end, this housing opening may be connected to an unfiltered gas channel of the line module. This unfiltered gas channel is embodied for conducting unfiltered gas, which comes from the internal combustion engine connected to the ventilation device, to the separating module. In other words, one of the housing openings of the housing may preferably be connected to an unfiltered gas channel of the line module. This unfiltered gas channel is associated with the geometrically parallel channels of the line module or forms one channel of the geometrically parallel channels of the line module.

Furthermore, one of the housing openings of the housing is preferably embodied for discharging clean gas, especially clean air, from the separating module. To this end, this housing opening is connectable to a clean gas channel of the line module, especially is attached to a clean gas channel of the line module. The clean gas channel is embodied to conduct clean gas that exits from one of the corresponding housing openings of the housing of the separating module to the internal combustion engine connected to the ventilation device. This clean gas channel is associated with the geometrically parallel channels of the line module or forms one of the geometrically parallel channels of the line module.

Furthermore, one of the housing openings of the housing is preferably embodied for discharging liquid, especially oil, from the separating module. To this end, this housing opening may be connected to a return channel of the line module, especially to an oil return channel of the line module. The return channel of the line module is embodied to conduct liquid, especially oil, that exits from one of the corresponding housing openings of the housing of the separating module to the internal combustion engine connected to the ventilation device. This return channel is associated with the geometrically parallel channels of the line module or forms one of the geometrically parallel channels of the line module.

Moreover, a cover surface of the separating module provided with the three aforesaid housing openings preferably forms a flange plane in which the corresponding housing openings are arranged. Preferably at least one in particular integrally embodied seal for axial sealing contact on a line module may be arranged on this cover surface for sealing the corresponding housing openings against one another and against the environment.

The three geometrically parallel channels of the line module, especially the unfiltered air channel, the clean air channel, and the oil return channel, are advantageously embodied to be attached to three geometrically parallel channels of a further line module that is essentially identically constructed. In this manner any number of line modules and separating modules associated therewith may be arranged one after the other.

The line module is thus advantageously embodied such that a desired number of line modules may be connected to one another, especially such that a desired number of line modules may be arranged one after the other, wherein the three geometrically parallel channels of adjacent line modules may be attached directly to one another.

Thus the channels of the line modules that are connected to one another may each form a common through-channel.

The modular design of the oil separating module and of the line module, as well as the ability to attach the line module directly to another line module, make it possible to vary the number of separating modules in the ventilation device. The variable number of combinations of line module and separating module has the advantage that the ventilation device may be flexibly adapted to different operating conditions.

Integrating the three geometrically parallel channels, especially the unfiltered air channel, the clean air channel, and the oil return channel, into the line module provides the advantage that, during the installation of a ventilation device constructed from a plurality of separating modules with associated line modules, three corresponding component channels of the component of the internal combustion engine must only be attached to one of the line modules for attaching this ventilation device to a component of the internal combustion engine.

The invention makes it possible to arrange and combine with one another, one after another, any number of identically embodied separating modules and identically embodied line modules. A separating module is preferably associated with each line module. The line module is preferably embodied such that the three geometrically parallel channels of the line module may be attached directly to three geometrically parallel channels of another line module. A ventilation device embodied in this way may be attached in a particularly simple and rapid manner to a component of an internal combustion engine, for instance a reciprocating piston internal combustion engine.

Thus, for instance, the following must be attached to or mounted on only one of the line modules of the ventilation device:
an unfiltered air channel connector embodied for connecting an unfiltered air channel, associated with the internal combustion engine or attached directly to the internal combustion engine, to the unfiltered air channel of the line module, a clean air channel connector embodied for connecting a clean air channel of the line module associated with the internal combustion engine, or attached directly to the internal combustion engine, and an oil return channel connector for connecting an oil return channel, associated with the engine or directly attached to the engine, to the oil return channel of the line module.

In one preferred embodiment, for attaching the separating module, the line module comprises an in particular planar connector flange that is preferably arranged parallel to the three channels.

In one preferred embodiment, the line module comprises on the connector flange a respective connecting opening for connecting the channels to corresponding housing openings of a separating module.

In one preferred embodiment, the line module comprises two connecting flanges for connecting to a connecting flange of a further line module, wherein the two connecting flanges are preferably arranged parallel to one another and/or perpendicular to the channels and/or perpendicular to the connector flange.

In one preferred embodiment, both ends of the channels are open at the connecting flanges so that by connecting two line modules at the connecting flanges, the channels of the line modules may be connected such that continuous, straight channels with a continuous constant cross-section are formed.

As an alternative to an embodiment as a separate component, the line module may also be integrated into a part of an internal combustion engine. The large parts that form the entire housing for the internal combustion engine may be used for this, in particular the crankcase, engine block, oil pan, cylinder head, and/or the cylinder head cover. Preferably at least one channel, but more preferably two, particularly preferably all three channels of the line module are embodied at least partially in the part of the internal combustion engine. This may be realized, for instance, in that outwardly open, groove-like or even tube-like channels or at least one channel are formed on the part of the internal combustion engine and at least also partially form the line module. Mixed variants are also possible in which, for instance, a channel or some of the channels are at least partially embodied on the part of the internal combustion engine, and the remaining channels are embodied in a line module subunit embodied as a separate add-on part so that the line module subunit and the part of the internal combustion engine together form the complete line module.

The separating module may be embodied, for instance, as a centrifugal force separator, for example a cyclone separator, as an impact or labyrinth separator, as a rotating separator, especially as a centrifuge or disc separator. Alternatively and preferably, the separating module may be embodied as an, in particular exchangeable, coalescence filter and have at least one coalescence filter element for separating liquid particles from aerosol, especially oil from air.

The housing of the separating module is preferably detachably connectable to the line module. Thus the separating module may be embodied as a replacement element.

Regardless of this or in connection herewith, it is possible to embody the separating element as a replacement element.

In one advantageous embodiment of the present invention, the separating module furthermore comprises a pressure control valve that is received in the housing and is embodied for regulating the pressure in the ventilation device, especially the crankcase pressure, for instance for limiting the negative pressure in the crankshaft ventilation system. At optimal pressure conditions, a ventilation device comprising such a separating module is variably adaptable to different operating conditions and ensures a high separation rate at optimal pressure conditions.

The separating module is preferably embodied such that the pressure existing in another component of the internal combustion engine, especially the crankcase, is applied to at least a first housing opening of the corresponding housing openings of the housing and the suction pressure is applied to at least a second housing opening of the corresponding housing openings of the housing.

The separating module advantageously comprises a clean side embodied for conducting separated clean gas and an unfiltered side embodied for conducting unfiltered gas, wherein at least a first housing opening of the corresponding housing openings of the housing is arranged on the clean side and at least a second housing opening of the corresponding housing openings of the housing is arranged on the unfiltered side.

The crankcase ventilation system is preferably embodied as a closed crankcase ventilation system in which the oil-containing leakage gas is returned to the combustion process.

The separating module is preferably embodied for separating an oil mist in the intake tract of an internal combustion engine.

The line module may be integrated into the internal combustion engine, in particular into an engine block of an internal combustion engine.

BRIEF DESCRIPTION OF THE DRAWINGS

As already discussed above, there are several approaches to advantageously embodying and developing the teaching of the present invention. In this regard, reference is made to the dependent claims; other embodiments, features, and advantages of the present invention are explained in greater detail in the following, inter alia using the exemplary embodiment illustrated in FIGS. 1 through 6.

Identical or similar configurations, elements, and features are provided with identical reference symbols in FIGS. 1 through 6.

DESCRIPTION OF PREFERRED EMBODIMENTS

Figure 1:
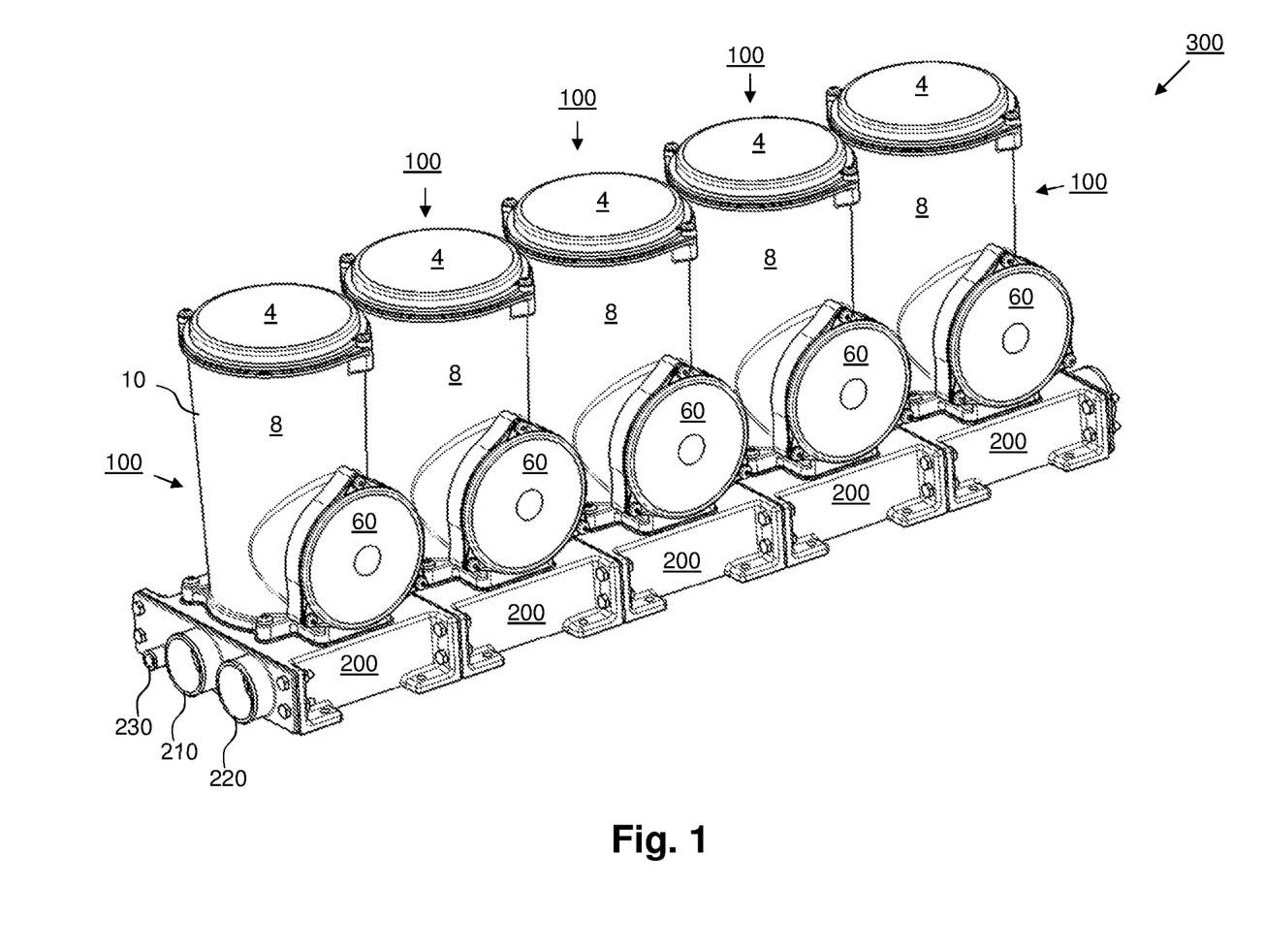
FIG. 1 is an isometric illustration of a view obliquely from above onto an exemplary embodiment of a ventilation device in accordance with the present invention.
Figure 2:
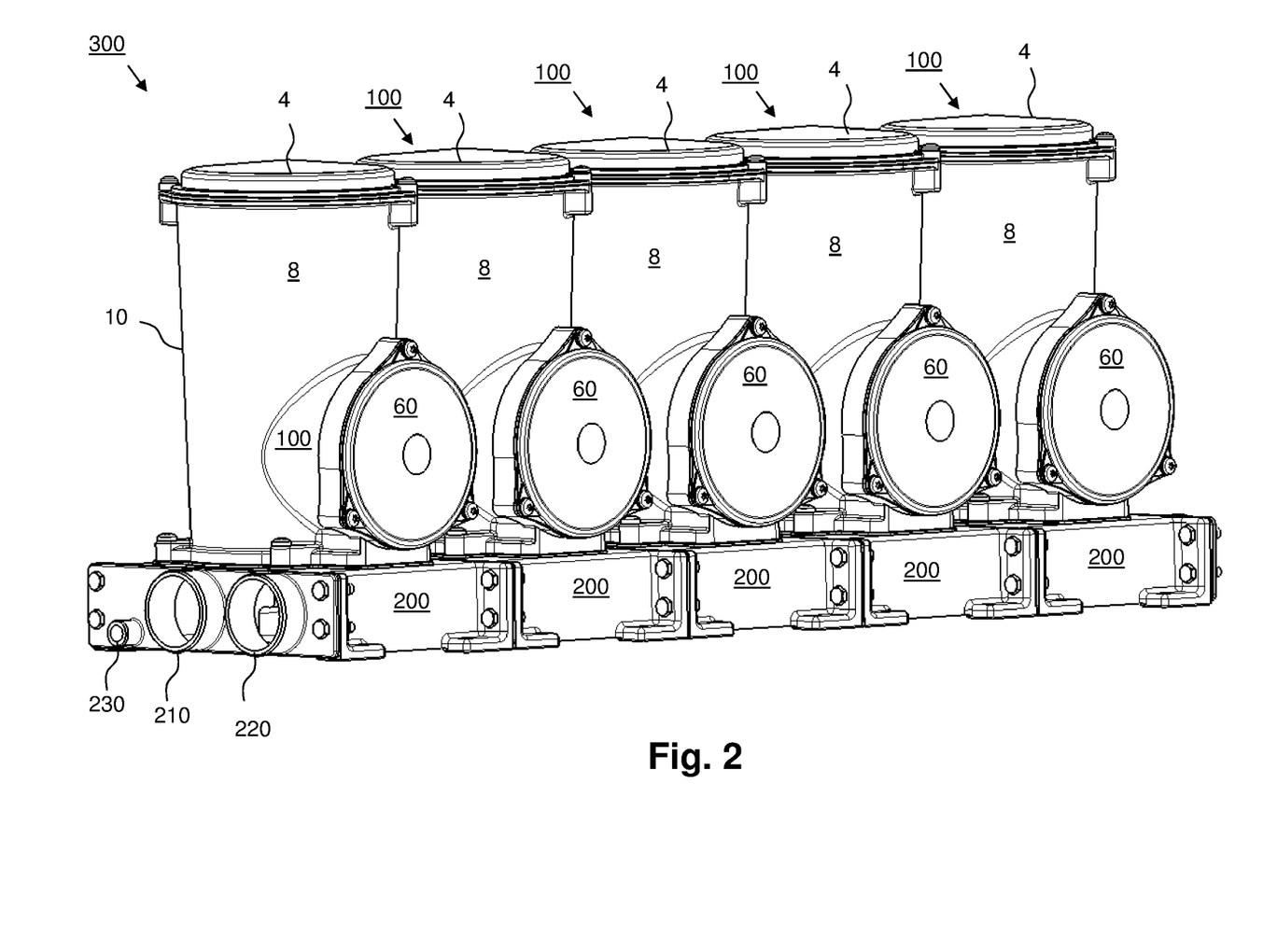
FIG. 2 is an isometric illustration of a front elevation of the ventilation device of FIG. 1.

In the exemplary embodiment of the present invention illustrated in FIGS. 1 and 2, a ventilation device 300, specifically a modular crankcase ventilation system, is illustrated that is embodied for:

discharging a gas flow laden with liquid particles, specifically an aerosol made of oil and air, from a crankcase of an internal combustion engine (not shown);

separating the liquid particles from the gas flow, especially separating the oil from the aerosol; and, returning the separated liquid particles, especially the separated oil, to the crankcase.

The crankcase ventilation system 300 comprises a plurality of separating modules 100, each of which is associated with a line module 200. FIGS. 3 through 6 each depict a combination of a separating module 100 and a line module 200 of the crankcase ventilation system 300 illustrated in FIGS. 1 and 2.

The modular structure of the line module 200 and of the separating module 100 has the advantage that any number of separating modules may be arranged in parallel and thus the crankcase ventilation system may be optimally adapted to the operating conditions. However, the line module may also be embodied with continuous channels, i.e., channels extending along a plurality of separating modules, for instance also by embodying at least some of the channels in a part of an internal combustion engine, for instance in a crankcase, engine block, oil pan, cylinder head, or cylinder head cover. The number of separating modules that may be arranged along one conduit may equal the number of cylinders in an internal combustion engine, or, in a V-arrangement, half the number of cylinders. Thus, variants with 2, 3, 4, 5, 6, 8, 10, and 12 are realistic, but even other numbers are possible, especially between 2 and 10 or 2 and 20.

The separating modules 100 and the line modules 200 are each independent elements or elements embodied separately from one another. In contrast, in the separating module illustrated in FIG. 2 of DE 44 29 822 A1, the lower area of the housing of this separating module is formed by the line module associated with it.

Each separating module 100 comprises a cylindrical or annular housing 10 that surrounds a separating element 20 embodied for separating the liquid particles from the gas flow.

The housing 10 comprises an annular wall surface 8 and two cover surfaces 4, 6 embodied for covering at least areas of the end faces of the annular wall surface 8. In contrast thereto, in the prior art illustrated in FIG. 1 of DE 44 29 822 A1, the separating module comprises an open end face.

The separating module 100 is detachably connectable to the line module 200. Since the separating module 100 is embodied as an independent element and both of its end faces are at least partially covered by a cover surface 4, 6, the separating module 100 may be transported separated from the line module, wherein the housing 10 of the separating module 100 protectively surrounds the separating element 20 received therein.

Figure 6:
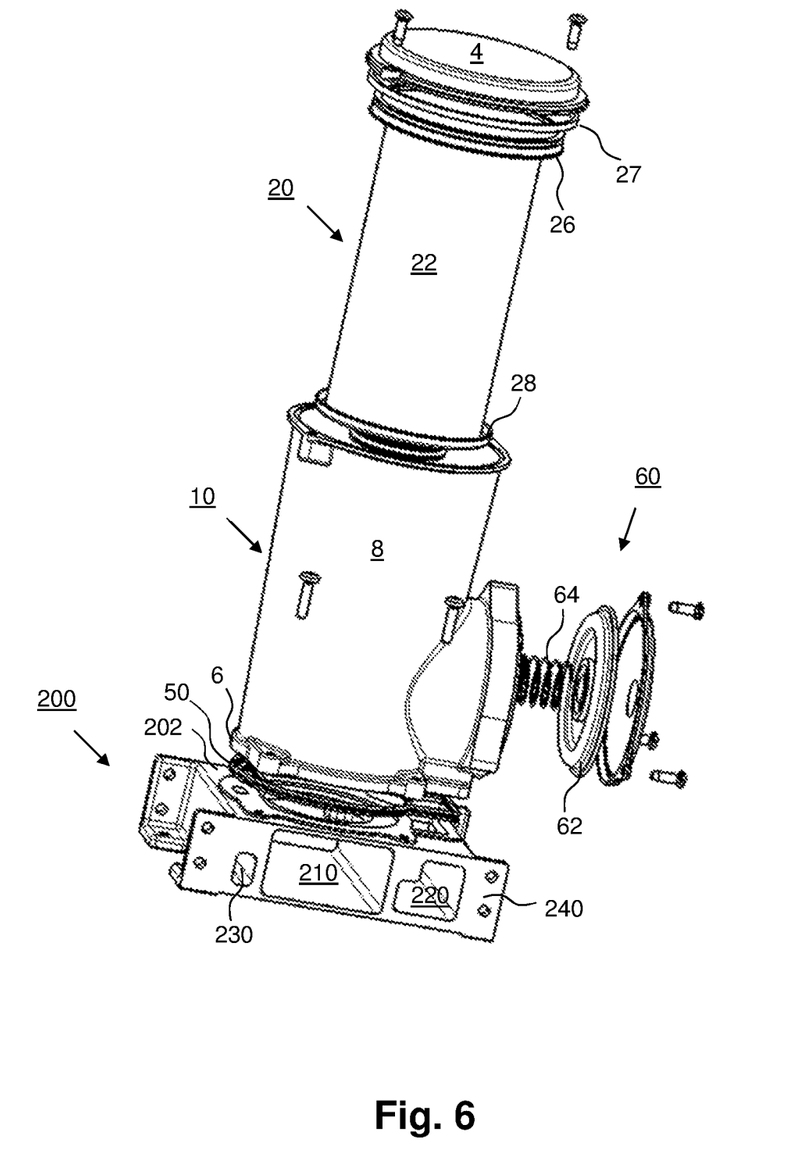
FIG. 6 is an exploded illustration of a separating module, connected to a line module, of the ventilation device of FIG. 1.

To be able to open the housing 10, one of the cover surfaces 4, 6 is embodied as a cover 4. For exchanging the separating element 20 embodied as a replacement element, the cover 4 may be detached from the wall surface 8 of the housing 10 and then the separating element 20 may be removed from the housing 1, as illustrated in FIG. 6.

The cover surface 6 opposing the cover 4 is embodied as the housing bottom and comprises corresponding housing openings, 12, 14, 16 for three geometrically parallel channels 210, 220, 230 of the line module 200.

The separating element 20 comprises at least one annular filter medium 22 embodied for separating the liquid particles from the gas flow, especially a coalescence filter element and/or a bellows and/or at least one wound filter element made of woven or non-woven fabric, for instance made of glass fiber, metal fiber, plastic fiber, especially polyester fiber, and mixtures thereof or a combination of successive layers of said materials.

For supporting the annular filter medium 22, the separating element 20 furthermore comprises a support tube 24 that is, for instance, metallic or made of plastic. The filter medium 22 is arranged about the support tube 24, for instance it is wound onto the support tube 24.

For at least covering areas of the cover surfaces of the annular filter medium 22, the annular filter medium 22 comprises two filter element cover elements 26, 28, for instance two end discs.

In the exemplary embodiment illustrated in FIGS. 1 through 6, the filter medium cover element 28 is positioned sealingly against the housing 10 and is embodied to reliably prevent unfiltered air from traveling past the cover surfaces of the annular filter medium 22 and into an interior of the annular filter medium 22. The filter medium cover element 26 is embodied closed so that it preferably closes off the interior of the annular filter medium 22 from the clean side of the separating element 20. Thus, the filter element cover elements 26, 28 separate the unfiltered side of the separating element 20 from the clean side of the separating element 20.

In the illustrated embodiment, the filter medium cover element 26 arranged in the area of the housing cover 4 is positioned against the housing cover 4 (see FIGS. 3 and 5) and is supported thereon. Alternatively, it would also be possible for support to be provided by a surface 8 of the housing. To establish a gas-tight connection between the housing cover 4 and the housing 10, a sealing element 27 is preferably arranged between the housing cover 4 and the housing 10.

The additional cover element 28 arranged in the area of the housing bottom 6 is positioned directly against the housing bottom 6.

In the illustrated exemplary embodiment, the three geometrically parallel channels 210, 220, 230 are embodied as fluid channels and are integrated into the line module 200. The line module 200 is embodied as a flange, specifically as a base module embodied for supporting the separating module 100.

A first one of the housing openings 12, 14, 16 of the housing 10 is an unfiltered gas opening 12, wherein this unfiltered gas opening 12 is embodied to be supplied by the channel 210 of the line module 200 associated therewith with the gas flow that is discharged from the internal combustion engine and laden with liquid particles, the so-called unfiltered gas. The unfiltered gas opening 12 is thus embodied to be connected to an unfiltered gas channel 210 of the line module 200 that is embodied for supplying unfiltered gas to the separating module.

A second one of the housing openings 12, 14, 16 of the housing is a clean gas opening 14, wherein this clean gas opening 14 is embodied to supply the channel 220 of the line module 200 associated therewith with a gas flow that has been cleaned in the separating module 100, especially with clean gas. The clean gas opening 14 is thus embodied to be connected to a clean gas channel 220 of the line module 200 that is embodied for discharging clean gas separated by the separating module 100.

A third one of the housing openings 12, 14, 16 of the housing 10 is a return opening 16, wherein this return opening 16 is embodied to supply the channel 230 of the line module 200 associated therewith with liquid that has been separated in the separating module 100, especially with separated oil. The return opening 16 is thus embodied to be connected to an oil return channel 230 of the line module 200 that is embodied for discharging oil separated by the separating module 100.

The line module 200 depicted in FIGS. 1 through 6 comprises three fluid channels, specifically an unfiltered gas channel 210, a clean gas channel 220, and a return channel 230. The unfiltered gas channel 210 of the line module 200 represents a direct connection between a raw side channel of the separating module 100 and an unfiltered gas conducting channel of the internal combustion engine. The clean gas channel 220 of the line module 200 represents a direct connection between a clean side channel of the separating module 100 and a clean gas conducting channel of the internal combustion engine. The return channel 230 of the line module 200 represents a direct connection between a separated liquid guiding channel of the separating module 100, especially a separated oil guiding channel of the separating module, and a liquid conducting channel, especially an oil conducting channel, of the internal combustion engine.

The line module preferably comprises two connecting flanges 240 for connecting to a connecting flange 240 of a further line module 200. The two connecting flanges 240 are preferably arranged parallel to one another and/or perpendicular to the channels 210, 220, 230 and/or perpendicular to the connector flange 202. Both ends of the channels 210, 220, 230 are open at the connecting flanges 240 so that, by connecting two line modules 200 at the connecting flanges 240, the channels 210, 220, 230 of the line modules 200 may be connected such that continuous, straight channels 210, 220, 230 with a continuous constant cross-section are formed. By stringing together a plurality of line modules 200, with a separating module 100 mounted on each one of them, different filtration performance may be realized modularly in a simple manner in a very compact space.

Figure 3:
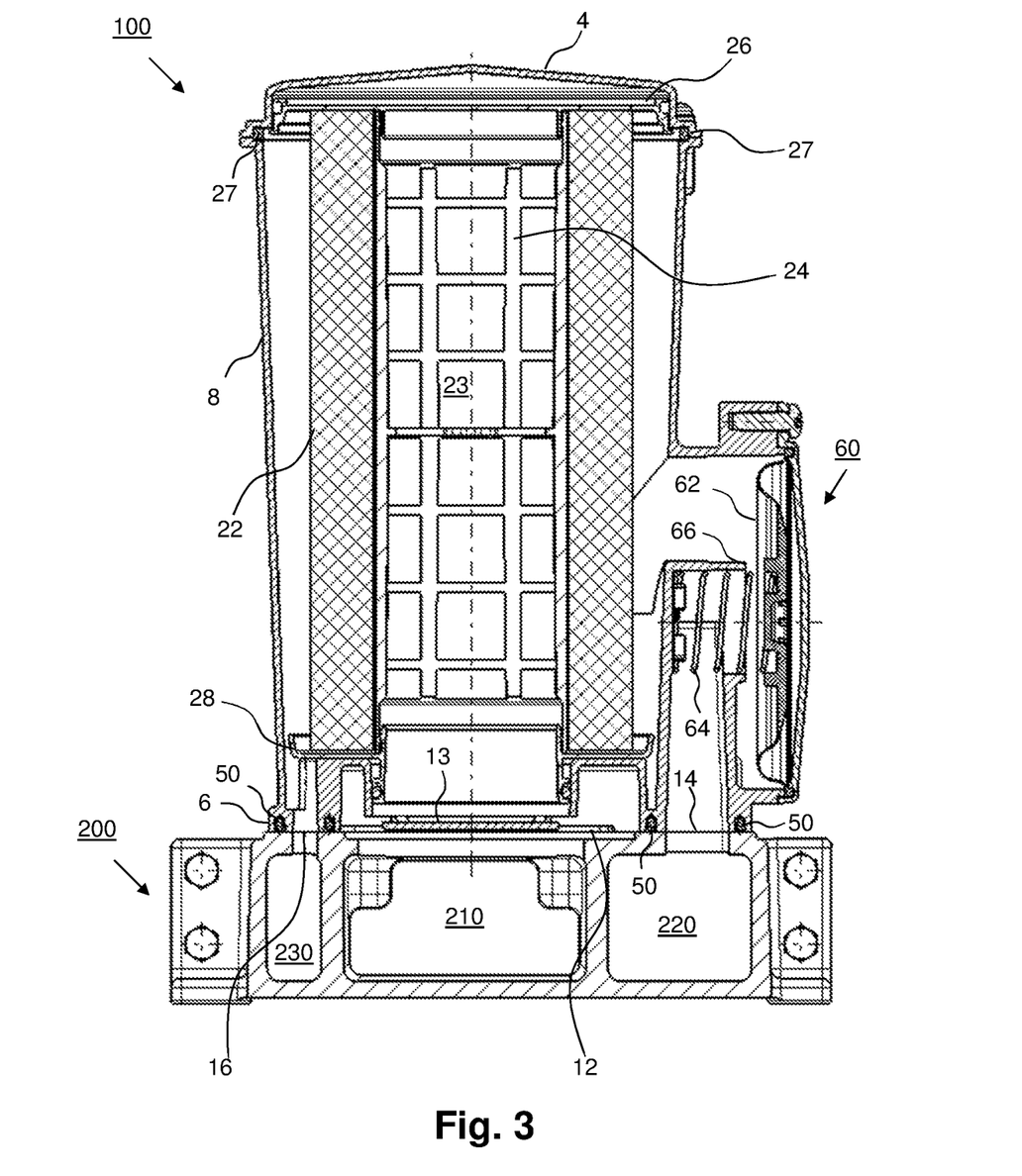
FIG. 3 depicts a longitudinal section of a separating module, connected to a line module, of the ventilation device of FIG. 1.

In contrast to this, the line module illustrated in FIGS. 2 and 3 of DE 44 29 822 A1 has five fluid channels, specifically two channels associated with the inlet openings 23, 30 (reference numbers relate to DE 44 29 822 A1) and embodied for conducting unfiltered gas or clean gas, two channels associated with the outflow openings 31, 32 and embodied for conducting unfiltered gas or clean gas, and one annular channel 48 embodied for conducting separated oil. The line module 200 if the invention as depicted in FIGS. 1 through 6 is therefore constructed much more compactly compared to the prior art disclosed in DE 44 29 822 A1.

The housing openings 12, 14, 16 are surrounded by and separated from one another by walls formed by the housing bottom 6.

In order to connect the corresponding housing openings 12, 14, 16 gas-tightly to the geometrically parallel channels 210, 220, 230 of the line module 200, a sealing element 50 is arranged between the housing 10 of the separating module 100 and the line module 200, especially at an area of the walls that surrounds the housing openings 12, 14, 16 and faces the line module 200.

The line module 200 preferably comprises a connector flange 202 that is embodied flat and arranged parallel to the three channels 210, 220, 230 for attaching the separating module 100 to the line module. The sealing element is preferably positioned sealingly against this connector flange and is braced between the separating module 100 and the line module.

For fluidic connection, each line module 200 preferably comprises on the connector flange 202 a respective connecting opening 212, 214, 216 for connecting the channels 210, 220, 230 to the housing openings 12, 14, 16 of a separating module 100.

The housing opening 12 is connected to the channel 210 via the connecting opening 212, the housing opening 14 is connected to the channel 220 via the connecting opening 214, and the housing opening 16 is connected to the channel 230 via the connecting opening 216.

Figure 4:
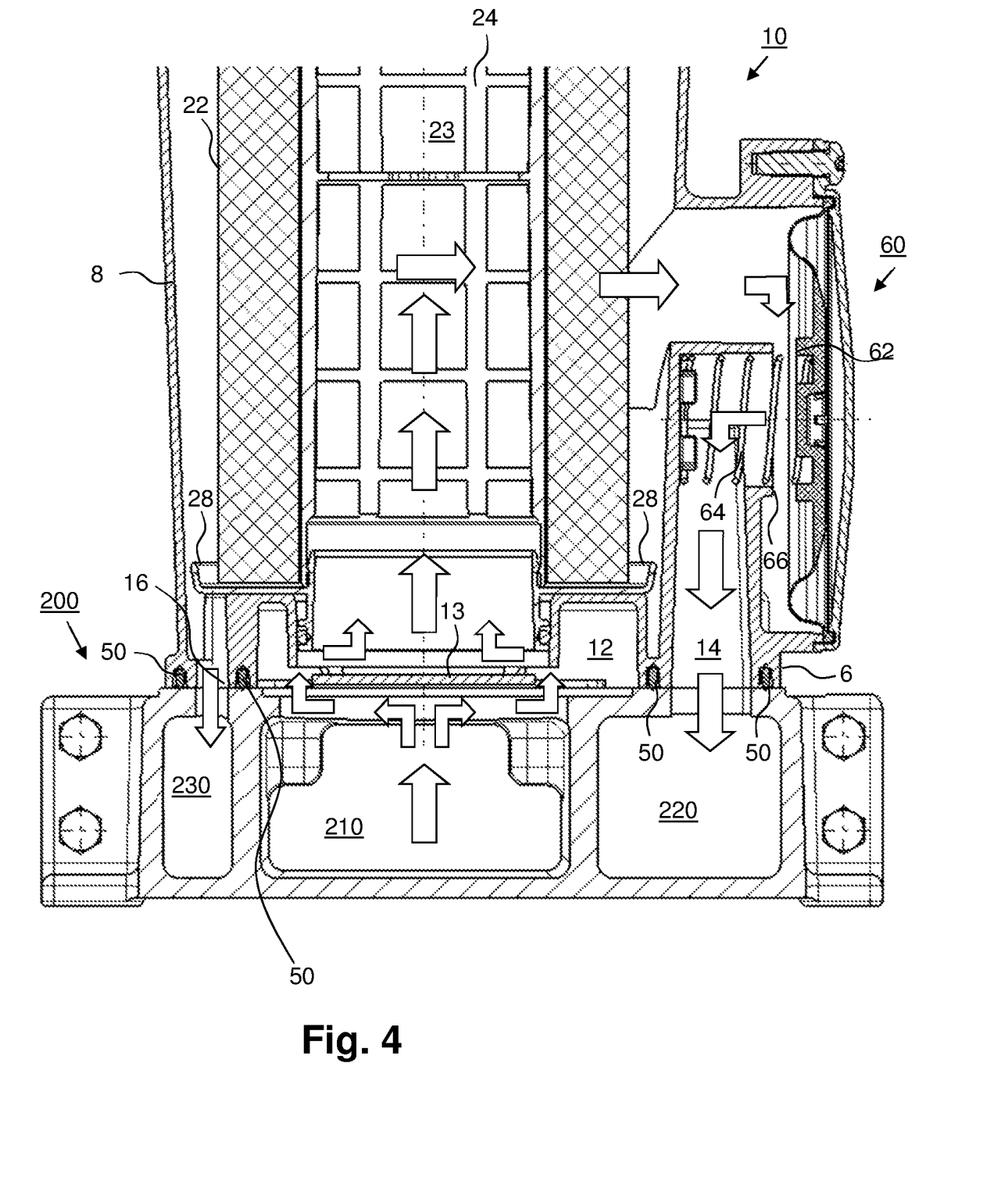
FIG. 4 is a detail view of the line module and the separating module of FIG. 3.
Figure 5:
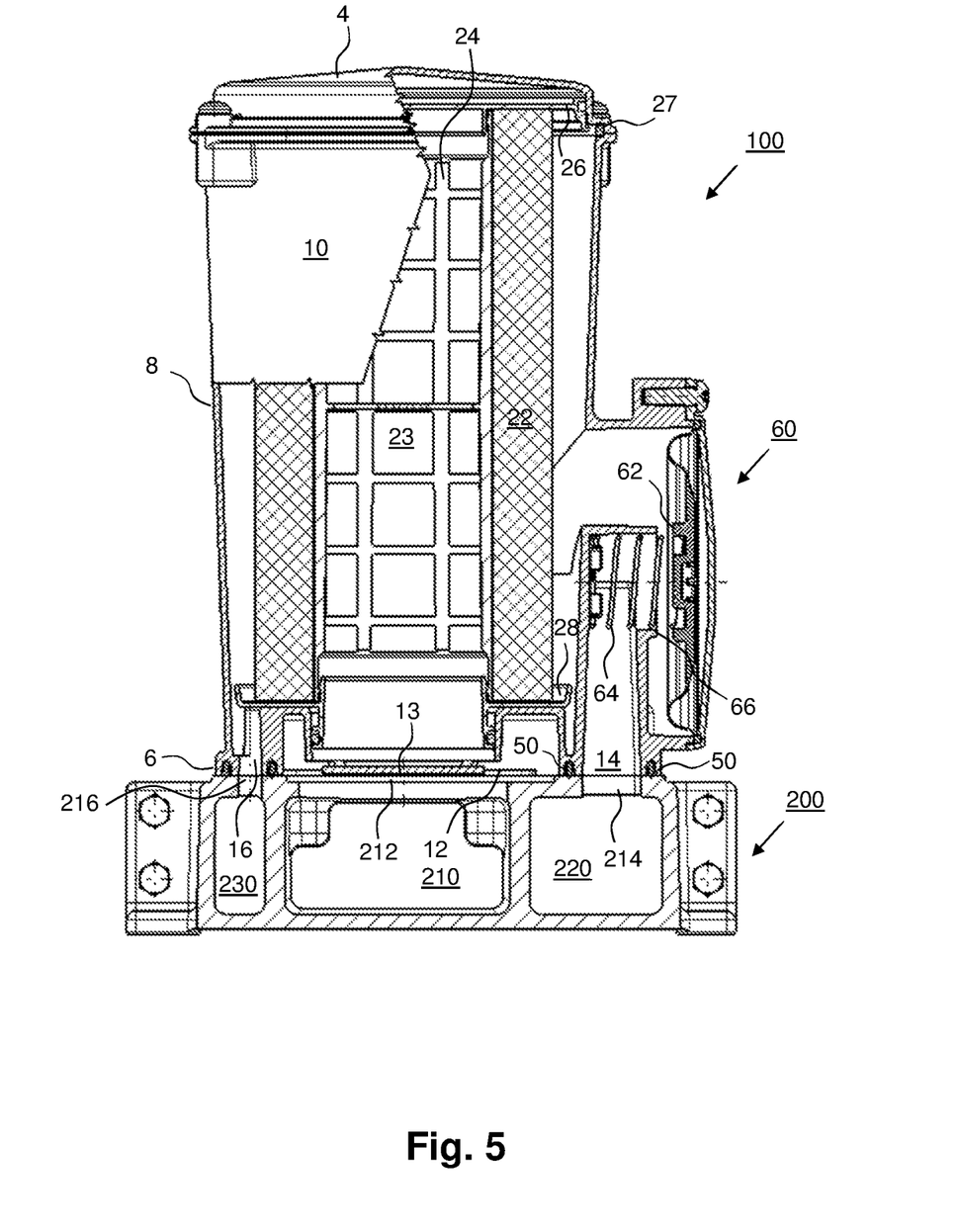
FIG. 5 is a side view, partly shown in longitudinal section, of the ventilation device of FIG. 1.

As illustrated in FIGS. 3 through 5, for sealing the connection between the corresponding housing openings 12, 14, 16 of the housing 10 of the separating module 100 and the geometrically parallel channels 210, 220, 230 of the line module 200, the walls of the housing openings 12, 14, 16 may have on their area facing the line module 200 a profile seal 50 received in a groove. This profile seal 50 may be embodied as a lifetime component.

The flow direction of the gas flow is marked in FIG. 4 by means of arrows.

A deflection element 13 embodied for deflecting the gas flow is arranged in the area of the unfiltered gas opening 12. The deflection element 13 illustrated in FIG. 4 is a baffle plate arranged at an angle or perpendicular to the gas flow. This baffle plate 13 conducts the supplied unfiltered gas as if through a labyrinth. The baffle plate 13, arranged in the area of the inlet 12 for unfiltered gas, acts as a pre-separating element.

After flowing through the unfiltered gas opening 12, the unfiltered gas supplied to the unfiltered gas opening 12 flows into a hollow interior 23 of the filter medium 22 and then flows through the filter medium 22 from the inside to the outside.

The separating module 100 comprises a pressure control valve 60, comprising a valve closing body 62 that cooperates with a valve seat 66. The pressure control valve 60 is received in the housing 10 and is especially arranged in the area of the wall surface of the separating module 100; it is embodied for controlling the pressure in the ventilation device 300, especially for limiting the negative pressure present in the crankcase ventilation system. Moreover, the pressure control valve 60 comprises a restoring spring 64 that acts on the valve closing body 62 in the direction facing away from the valve seat 66. The valve seat 66 of the pressure control valve 60 is formed by a side wall of the housing 10 of the separating module 100.

After flowing through the filter medium 22, the separated clean gas flows through the pressure control valve 60 and then the clean gas exits the separating module through the clean gas opening 14 and directly enters the clean gas channel 220 of the associated line module 200.

The pressure control valve 60 is embodied such that the ambient pressure acts on one side of the valve closing body 62 and preferably on one side of the membrane that carries it. On the other side, the suction pressure existing in the clean gas channel 220 acts inside the valve seat 66 and the crankcase pressure acts outside the valve seat 66. In addition, the force of the spring 64 acts on the valve closing body 62.

The separating module 100 is embodied such that the pressure existing in the crankcase is applied to the unfiltered gas opening 12 of the housing and the suction pressure is applied to the clean gas opening 14 of the housing 10.

The restoring spring 64 of the pressure control valve 60 acting on the valve closing body 62 with a spring force is arranged in the area of the suction pressure, especially in the area of the gas outlet of the pressure control valve. This has the advantage that installation space is saved compared to the prior art disclosed, for instance, in WO 2005 088 417 A1, in which the restoring spring is arranged in the area of the crankcase pressure.

Thus, FIGS. 1 through 6 illustrate a compactly embodied modular crankcase ventilation system 300 that comprises a plurality of units, each formed by a separating module 100 and a line module 200. The number of units of the crankcase ventilation system 300 formed from separating module 100 and line module 200 is variable as desired.

While specific embodiments of the invention have been shown and described in detail to illustrate the inventive principles, it will be understood that the invention may be embodied otherwise without departing from such principles.

LIST OF REFERENCE CHARACTERS

4 First cover surface, especially cover, of the housing 10
6 Second cover surface, especially bottom, of the housing 10
8 Wall surface of the housing 10
10 Housing of the oil separator 100
12 First housing opening, especially unfiltered gas opening, of the housing 10 for the oil separator 100
13 Deflection element, especially baffle plate
14 Second housing opening, especially clean gas opening, of the housing 10 for the oil separator 100
16 Third housing opening, especially oil return opening, of the housing 10 for the oil separator 100
20 Separating element, especially oil separating element or air-oil separator element
22 Annular filter medium, especially coalescence filter element, bellows, or wound filter element, for instance made of glass fiber or nonwoven fabric
23 Hollow interior of the filter medium 22
24 Support tube, especially center tube, for supporting the annular filter medium 22
26 Cover element, especially end disc, for covering an axial end area, especially an end-face area or a cover surface, of the filter medium 22
27 Sealing element compressed between filter medium cover element 26 and surface 8 of the housing 10
28 Second or other cover element, especially second or other end disc, for covering another axial end area, especially another end-face area or another cover surface, of the filter medium 22
50 Sealing element, especially profile seal, arranged on the area of the separating module 100 facing the line module 200 and embodied for sealing the connection between the separating module 100 and the line module 200
60 Pressure control valve
62 Valve closing body, especially control pin, of the pressure control valve 60
64 Restoring spring for pressure control valve 60
66 Valve seat for pressure control valve
100 Separating module, especially oil separator
200 Line module, especially for directly or indirectly attaching the separating module 100 to a connector element or connecting head embodied on a component of an engine, for instance a receiving flange or base module embodied for receiving the separating module 100, especially as an integral component of a part of an internal combustion engine, for instance the channels are embodied in a crankcase, engine block, oil pan, cylinder head, or cylinder head cover
202 Connector flange, especially connector flange plane, for attaching the separating module 100
210 First channel of the line module 200, especially unfiltered gas channel, especially unfiltered air supply line
212 First connecting opening of the line module 200, for connecting the first channel 210 to the first housing opening 12
214 Second connecting opening of the line module 200, for connecting the second channel 220 to the second housing opening 14
216 Third connecting opening of the line module 200, for connecting the third channel 230 to the third housing opening 16
220 Second channel of the line module 200, especially clean gas channel, for instance clean air supply line or clean air discharge line
230 Third channel of the line module 200, especially return channel, for instance oil return channel
240 Connecting flange, especially connecting flange plane, for connecting to a connecting flange of a further line module 200, especially perpendicular to connector flange 202 and channels 210, 220, 230
300 Ventilation device, especially device for separating oil from an oil-air mixture or from an aerosol, for instance crankcase ventilation system

What is claimed is:

1. A separating module for a ventilation device, wherein the ventilation device is configured to discharge a gas flow laden with liquid particles from a component of an internal combustion engine, the separating module comprising:
a separator housing which is substantially cylindrical and elongated along a central axis, the separator housing having
an upper axial end face;
a base axial end face;
an annular outer wall that is substantially cylindrical and surrounds the central axis, and extends between the upper axial end and the base axial end;
a separating element configured to separate liquid particles from the gas flow laden with liquid particles, the separating element arranged in an interior of the separator housing and comprising:
an axially elongated annular filter medium arranged in the interior of the separator housing and surrounding the central axis;
wherein the separator housing further includes:
a housing bottom cover arranged on a base axial end face of the annular outer wall of the separator housing, the housing bottom cover having at least three flow openings configured to fluidically connect to respective flow openings provided in a connector flange of a line module, when the separating element is installed on the line module, the at least three flow openings including:
an unfiltered gas opening, opening into the interior of the separator housing, the unfiltered gas opening configured to be supplied with gas flow laden with liquid particles;
a liquid return opening, opening into the hollow interior of the separator housing, the liquid return opening returning liquid separated from unfiltered gas;
a clean gas opening;
a pressure control valve arranged on the separator housing and having a clean gas outlet channel connected to the clean gas opening provided in the housing bottom cover,
wherein the pressure control valve is arranged on the separator housing on a radial outer side of the annular outer wall of the separator housing, the pressure control valve having a clean gas outlet channel formed at least partially by the housing bottom cover and arranged on the radial outer side of the annular outer wall of the separator housing, the clean gas outlet channel connected to the clean gas opening provided in the housing bottom cover.

2. The separating module according to claim 1, wherein wherein the separator housing comprises
a first cover arranged on arranged on the upper axial end face of the separator housing,
wherein the first cover and the housing bottom cover cover at least areas of respective axial end faces of the annular outer wall.

3. The separating module according to claim 2, wherein the housing bottom cover forms a flange plane and
wherein the unfiltered gas opening, the liquid return opening, and the clean gas opening are arranged in the flange plane.

4. The separating module according to claim 2, further comprising
an integrally embodied seal disposed on the housing bottom cover and configured to provide axial sealing contact relative to the line module to seal the housing bottom cover openings relative to each other and relative to the environment.

5. The separating module according to claim 1, wherein the axially elongated annular filter medium comprises a hollow interior,
wherein, after passing through the unfiltered gas opening, the gas flow laden with liquid particles flows into the hollow interior, passes through the axially elongated annular filter medium from the hollow interior to exterior of the axially elongated annular filter medium and the cleaned gas flow that is free of liquid particles or essentially free of liquid particles exits from an outer surface of the axially elongated annular filter medium.

6. The separating module according to claim 1, further comprising
at least one deflection element arranged in the area of the unfiltered gas opening and configured to deflect the gas flow laden with liquid particles.

7. The separating module according to claim 6, wherein the at least one deflection element comprises
at least one baffle plate acting as a pre-filter and arranged in the area of the unfiltered gas opening so as to be oriented at an angle to or vertical to the gas flow laden with liquid particles.

8. The separating module according to claim 1, wherein the pressure control valve is disposed in the separator housing and configured to control a pressure existing in the ventilation device,
wherein the pressure control valve comprises
a valve seat and
a valve closing body interacting with the valve seat,
wherein the pressure control valve further comprises
a restoring spring acting on the valve closing body in a direction facing away from the valve seat.

9. The separating module according to claim 8, wherein the pressure control valve limits a negative pressure existing in the ventilation device.

10. The separating module according to claim 8, wherein the pressure control valve is configured such that ambient pressure acts on a first side of the valve closing body, a suction pressure existing in the clean gas outlet channel acts on a second side of the pressure control body inside the valve seat, and a crankcase pressure acts on the second side of the pressure control body outside of the valve seat,
wherein additionally an opening force of the restoring spring acts on the valve closing body,
wherein the separating module is configured such that a pressure existing in the component of the internal combustion engine is applied at least to the unfiltered gas opening and the suction pressure existing in the clean gas channel is applied to the clean gas opening.

11. The separating module according to claim 10, wherein the restoring spring is arranged in the area where the suction pressure is acting.

12. The separating module according to claim 1, further comprising
separating module channels conducting fluids,
wherein all of the separating module channels are associated with one of the housing bottom cover openings, respectively.

13. A ventilation device discharging from an internal combustion engine a gas flow laden with liquid particles, separating liquid particles from the gas flow; and returning the separated liquid particles to the internal combustion engine; the ventilation device comprising:
at least one separating module according to claim 1;
the separator housing configured to be connected to a line module comprising at least three channels that are geometrically parallel to each other, the separator housing comprising housing openings that correspond to the at least three channels;
at least two line modules each forming a base module on which the axial end face of a respective one of the separator housings is mounted,
each line module including:
a first connecting flange arranged on a first side of the line module;
a second line connecting flange arranged on an opposite second side of the line module;
at least three module flow channels, arranged in parallel and extending through the line module from the first connecting flange to the second connecting flange;
wherein the connecting flanges are configured to mate against and fluidically connect the connecting flange and the at least three module flow channels of the line module to the connecting flange and the at least three module flow channels of a further adjacent line module;
a connector flange arranged on an upper end face of the line module, the connector flange contacting against the housing bottom cover and fixed to the based axial end face of the separating module;
the least three module flow channels include:
an unfiltered gas channel configured to supply a gas flow laden with liquid particles through the connector flange to the unfiltered gas opening of the separating module, when the separating module is mount onto the connector flange of the line module;
a clean gas channel configured to receive a clean gas from the clean gas opening of the separating module through the connector flange, when the separating module is mount onto the connector flange of the line module; and
a return channel configured to receive separated liquid through the liquid return opening of the separator module, when the separating module is mount onto the connector flange of the line module.

* * * * *